(12) United States Patent
Sasaki et al.

(10) Patent No.: US 7,201,999 B2
(45) Date of Patent: Apr. 10, 2007

(54) SECONDARY CELL

(75) Inventors: Tsuyoshi Sasaki, Aichi-gun (JP); Yoji Takeuchi, Seto (JP); Hideyuki Nakano, Owariasahi (JP); Tetsuro Kobayashi, Seto (JP); Yoshio Ukyo, Seto (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 513 days.

(21) Appl. No.: 10/670,484

(22) Filed: Sep. 26, 2003

(65) Prior Publication Data

US 2004/0157123 A1 Aug. 12, 2004

(30) Foreign Application Priority Data

Oct. 1, 2002 (JP) .............................. 2002-289128

(51) Int. Cl.
*H01M 4/58* (2006.01)
*H01M 4/62* (2006.01)

(52) U.S. Cl. ..................................... 429/218.1; 429/232

(58) Field of Classification Search ............. 429/218.1, 429/232
See application file for complete search history.

(56) References Cited

U.S. PATENT DOCUMENTS

| | | | | |
|---|---|---|---|---|
| 4,803,134 | A * | 2/1989 | Sammells ..................... | 429/16 |
| 5,298,235 | A * | 3/1994 | Worrell et al. ................ | 429/33 |
| 5,403,461 | A * | 4/1995 | Tuller et al. ................. | 204/252 |
| 6,287,716 | B1 * | 9/2001 | Hashimoto et al. ........... | 429/33 |

FOREIGN PATENT DOCUMENTS

| | | |
|---|---|---|
| JP | 4-238815 | 8/1992 |
| JP | 4-269461 | 9/1992 |
| JP | 5-36441 | 2/1993 |
| JP | 10-144351 | 5/1998 |
| JP | 2000-138073 | 5/2000 |
| JP | 2001-6674 | 1/2001 |
| JP | 2002-25555 | 1/2002 |

OTHER PUBLICATIONS

P.G. Bruce et al., "Intercalation compounds with lithium and oxygen guests", Proceedings of the Third International Symposium on Ionic and Mixed Conducting Ceramics, 1998, p. 205-218.*
S. Hatake, et al., "New Lithium-Ion Conducting Compounds $3Li_3N$-MI (M=Li, Na, K, Rb) and Their Application to Solid-State Lithium-Ion Cells", vol. 68, Journal of Power Sources, 1997, pp. 416-420.
G. Togashi, et al., "Fabricaton and Evaluation of Solid State Cells With the Fluoride Solid Solutions", Extended Abstract of the $27^{th}$ Symposium on Solid State Ionics, 2001, pp. 34-35 (with English Abstract).
K. Kojima, et al., "Magnesium Insertion into Nasicon-Type Complex Oxides", pp. 634-635, 2000 (with English Abstract).

* cited by examiner

*Primary Examiner*—Gregg Cantelmo
(74) *Attorney, Agent, or Firm*—Oblon, Spivak, McClelland, Maier & Neustadt, P.C.

(57) ABSTRACT

There is provided a secondary cell having a positive electrode and a negative electrode which is made of solid active materials and an electrolyte layer which has been intervened between the positive electrode and the negative electrode. At least one of solid active materials for constituting the positive electrode and the negative electrode is composed of a mixed oxygen ion and electron conductor capable of inserting and eliminating oxygen ion or absorbing and releasing oxygen.

11 Claims, 6 Drawing Sheets

SECONDARY CELL

CROSS-REFERENCES TO RELATED APPLICATIONS

The present application claims priority under 35 U.S.C.§119 to Japanese Application No.2002-289128, filed Oct. 1, 2002, entitled "SECONDARY CELL". The contents of this application are incorporated herein by reference in their entirety.

BACKGROUND OF THE INVENTION

1. Field of the Invention

The present invention relates to a secondary cell in which charging and discharging are performed by utilizing the absorbing and releasing oxygen or inserting and eliminating oxygen ion.

2. Discussion of the Background

In recent years, accompanying the rapid popularization of information related devices, communication related devices and the like such as a personal computer, a video camera, a portable telephone and the like, the development of a secondary cell which is excellent for their electric sources has been considered as being important. Moreover, for the other fields in addition to the above-described information related devices and communication related devices, for example, also in the automotive industry, the development of a secondary cell having a high output and a high capacity for use in an electric automobile and a hybrid automobile as a low pollution vehicle has been proceeded. Furthermore, for the purpose of the leveling of electric power load due to the power generation and its power storage during night when electric power load is low, and also for the purpose of the storage of electric power derived from the natural energies such as a solar cell, the electric generation by wind power and the like which are varied by the climate and meteorological circumstances, the utilization of a secondary cell has been considered, and the development of a large scale secondary cell has been a task.

In such a background, in recent years, a secondary cell has been required to have a high performance, a long life span, a lower cost and the like. Then, as a secondary cell fulfilling such requirements, at present, a lithium ion secondary cell in which the insertion and elimination of lithium ion on the positive electrode and negative electrode are utilized for charging and discharging is considered as being the most promising secondary cell.

Moreover, the lithium ion secondary cell is characterized in that it can be made into an all-solid-state secondary cell by employing an ion conductive solid as an electrolyte (see patent documents 1–5 and non-patent document 1).

Thus, the liquid leakage and the like are eliminated and the safety is enhanced by thus making the lithium ion secondary cell into an all-solid-state secondary cell. Moreover, since the charge and discharge of the cell occur only by the simple reaction, and a side reaction does not occur, the longer life span of the cell can be expected.

Now, a secondary cell in which the insertion and elimination of the substances except for lithium ion are utilized for charging and discharging of the cell has been also considered. As such a secondary cell, for example, there is a secondary cell in which the insertion and elimination of fluoride ion are utilized (see patent document 6 and non-patent document 2). Moreover, a cell system in which the insertion and elimination of magnesium ion are utilized has been proposed (see patent document 7 and non-patent document 3). Moreover, a Nickel hydrogen cell which is commercially available in the market can be also considered as a cell in which the insertion and elimination of $H^+$ are utilized.

In this way, up to this time, as a secondary cell, cells in which the insertion and elimination of $Li^+$, $F^-$, $Mg^{2+}$ and $H^+$ are utilized for charging and discharging have been in practical use, or are being considered toward practical use.

[Patent Document 1]
JP 1992-269461 Unexamined Patent Publication (Kokai)

[Patent Document 2]
JP 1993-36441 Unexamined Patent Publication (Kokai)

[Patent Document 3]
JP 1998-144351 Unexamined Patent Publication (Kokai)

[Patent Document 4]
JP 2000-138073 Unexamined Patent Publication (Kokai)

[Patent Document 5]
JP 2001-6674 Unexamined Patent Publication (Kokai)

[Patent Document 6]
JP 1992-238815 Unexamined Patent Publication (Kokai)

[Patent Document 7]
JP 2002-25555 Unexamined Patent Publication (Kokai)

[Non-Patent Document 1]
S. Hatake et al., "Journal of Power Sources", (United States of America), Elsevier Science, 1997, Vol. 68, p. 416–420.

[Non-Patent Document 2]
Preprint of the 27th Symposium on Solid State Ionics, Solid State Ionics, 2001, p. 34–35.

[Non-Patent Document 3]
Preprint of the 41st Battery Symposium, the Electrochemical Society of Japan, the Committee of Battery Technology, 2000, p. 634–635.

However, several problems have been pointed out concerning with the secondary cells in which the insertion and elimination of $Li^+$, $F^-$, $Mg^{2+}$ and $H^+$ are utilized.

First, as for a secondary cell in which the insertion and elimination of $F^-$ and $Mg^{2+}$ are utilized, up to the present time, an appropriate material for electrode or an appropriate material for electrolyte has not been found yet. Therefore, these have not achieved the stage where these can be practically used as a secondary cell.

Next, as for a secondary cell in which the insertion and elimination of $Li^+$ are utilized, for example, when it is rapidly charged, there is a fear that Li not inserted completely is precipitated in a dendrite structure. The activity of this dendrite is very high. Thus, there is a fear that upon being exposed to the atmospheric air, the dendrite is reacted with oxygen in the atmospheric air, and the secondary cell does not exert the characteristics in a stable manner.

Furthermore, also in a secondary cell in which the insertion and elimination of $H^+$ are utilized, when a hydrogen occlusion alloy that completely has occluded hydrogen is exposed to the atmospheric air, there is a fear that the hydrogen occlusion alloy generates hydrogen and reacts with oxygen in the atmospheric air, and the secondary cell does not exert the characteristics in a stable manner.

Moreover, as the all-solid-state secondary cell, a cell whose operation is surely recognized at present is only a cell in which lithium ion is used as movable ion. However, in an all-solid-state secondary cell in which lithium ion is used as movable ion, there are problems that a solid electrolyte inside of which Li ion moves at a high speed has not been found and the like. Furthermore, as a particularly serious problem, there is a problem of an interface between electrodes and an electrolyte. Namely, in an all-solid-state secondary cell in which lithium ion is employed as movable ion, it is required that Li ion can smoothly pass through the interface between electrodes and an electrolyte. However, actually, in this interface, another compound which does not transmit Li ion is formed at the time of charging and discharging reactions, and the problem that the charging and discharging reactions are hindered arises. For example, in the case where a complex oxide of Li and element A are employed for electrodes and a complex oxide of Li and element B are employed for an electrolyte, the complex oxide of element A and element B is generated at the interface between electrodes and the electrolyte and the transmission of Li ion is hindered.

Thus, there are a variety of problems concerning with the conventional secondary cells. Consequently, a secondary cell in which substances except for $Li^+$, $F^-$, $Mg^{2+}$, and $H^+$ are employed as movable ion has begun to be considered. However, a secondary cell which is stable and can withstand the practical use has not been found yet.

SUMMARY OF THE INVENTION

The present invention has been made in consideration of such conventional problems, and an object of the present invention is to provide a secondary cell in which charge and discharge can be performed by utilizing the insertion and elimination of oxygen ion or absorption and release of oxygen and the characteristics can be stably exerted.

According to the present invention, there is provided a secondary cell comprising: a positive electrode and a negative electrode both comprising a solid active material; and an electrolyte layer which has been intervened between the positive electrode and the negative electrode, wherein at least one of the solid active materials for constituting the positive electrode and the negative electrode is composed of a mixed oxygen ion and electron conductor capable of inserting and eliminating oxygen ion or absorbing and releasing oxygen.

In the present invention, at least one of the solid active materials for constituting the positive electrode and the negative electrode comprises mixed oxygen ion and electron conductor capable of inserting and eliminating oxygen ion or absorbing and releasing oxygen.

Therefore, the secondary cell can perform the charging and discharging of the cell by absorption and release of oxygen or insertion and elimination of oxygen ion within the cell system. Namely, in the present invention, at the time when the cell is charged and discharged, an electron and oxygen ion are inserted or eliminated or oxygen is absorbed or released on the surface of the positive electrode and/or negative electrode comprising the above-described mixed oxygen ion and electron conductor accompanying its electrochemical oxidation-reduction reaction. Then, an electron and oxygen ion which has been inserted or eliminated or oxygen which have been absorbed or released diffuse within the positive electrode, the negative electrode or the electrolyte layer, the storage or discharging is performed.

In general, it is considered that the conduction of the oxygen ion in the solid substance does occur only at a high temperature. Actually, for example, as in the case of a solid oxide fuel cell (SOFC) and oxygen separation film and the like, an oxygen ion conductive film which requires the movement of oxygen is used at a high temperature equal to or more than 600° C. In this oxygen ion conductive film, the rate-determining factor at the time of the absorbing and releasing behavior of oxygen is not the process of diffusion of oxygen ion within the material, but the process of absorption and dissociation of oxygen molecule and ionization to oxygen ion, and it's reverse process, that is the process of discharging oxygen ion and generation and desorption of oxygen molecule.

In the present invention, instead of using oxygen gas whose reaction rate is slow as an active material, for example, oxygen ion originally existing in the solid active materials such as oxide and the like can be used as a movable ion. Therefore, even if it is not at a high temperature, oxygen or oxygen ion moves within the positive electrode or the negative electrode, and the charge and discharge of the cell can be performed.

In this way, in the present invention, the absorption and release of oxygen or the insertion and elimination of oxygen ion are utilized for charging and discharging reactions of the cell. Such a secondary cell is essentially different from the conventional secondary cells using Li ion and hydrogen ion as a movable ion.

Moreover, in the present invention, as described above, by utilizing oxygen or oxygen ion within the cell system at the time when charging or discharging reaction is performed, the characteristics of the cell can be stably exerted comparing to the conventional secondary cells. Specifically, only the cell reaction is capable of being efficiently and continuously endured without reacting with oxygen in the atmospheric air.

In this way, according to the present invention, a secondary cell can be provided in which charge and discharge can be performed by utilizing the absorption and release of oxygen or insertion and elimination of oxygen ion and the characteristics can be stably exerted.

BRIEF DESCRIPTION OF THE DRAWINGS

A more complete appreciation of the invention and many of the attendant advantages thereof will become readily apparent with reference to the following detailed description, particularly when considered in conjunction with the companying drawings, in which.

DESCRIPTION OF THE PREFERRED EMBODIMENT

Figure 1:
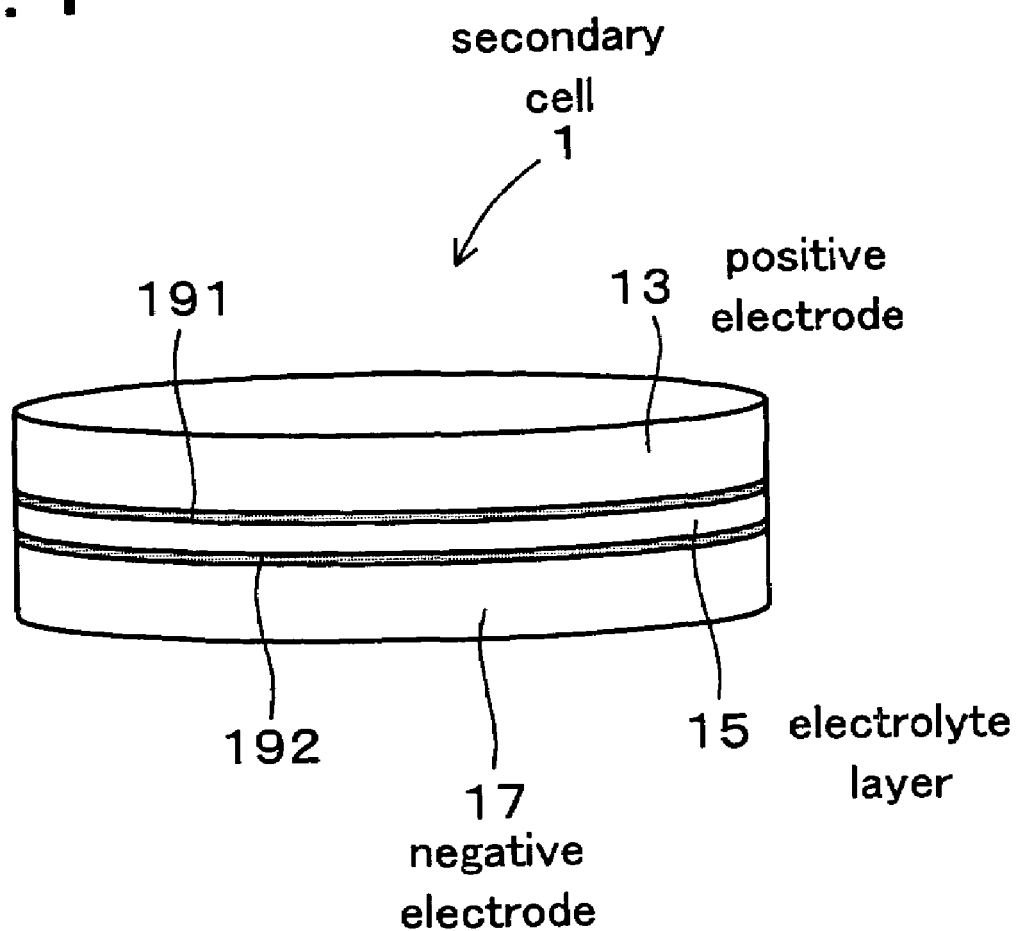
FIG. 1 is an illustration of a perspective view showing a secondary cell according to Example 1 of the present invention.

In the present invention, at least one of solid active materials for constituting the positive electrode and the negative electrode comprises a mixed oxygen ion and electron conductor capable of inserting and eliminating oxygen ion or absorbing and releasing oxygen. In the case where the mixed oxygen ion and electron conductor is used for only one of them out of the positive electrode and the negative electrode, for the other one, for example, an electrode comprising an active material capable of inserting and eliminating lithium ion, hydrogen ion and the like can be used.

The mixed oxygen ion and electron conductor is composed of, for example, oxide and the like, which are capable of absorbing and releasing an electron and oxygen or inserting and eliminating oxygen ion. As such a mixed oxygen ion and electron conductor, for example, Ceria-Zirconia complex oxide, Ceria-Yttria complex oxide, (La, Sr) $CoO_{3-\delta}$, (La, Sr) $FeO_{3-\delta}$, $Bi_2O_3$, $CaTi_{0.8}Fe_{0.2}O_{3-\delta}$, $SrFeCo_{0.5}O_{4-\delta}$ and the like are listed.

It should be noted that in the above-described chemical formula, $\delta$ represents a minute numerical value of $\delta>0$. In compounds of (La, Sr) $CoO_{3-\delta}$, (La, Sr) $FeO_{3-\delta}$, $Bi_2O_3$, $CaTi_{0.8}Fe_{0.2}O_{3-\delta}$, $SrFeCo_{0.5}O_{4-\delta}$, the conductivity can be carried on by lacking oxygen atoms by the portion of only minute amount $\delta$. As for the upper limitation of $\delta$, it is considered that different upper limitation values are taken depending upon the respective compounds, $\delta$ can take, for example, a value in the range of $0<\delta \leq 0.5$. In the case where the value of $\delta$ exceeds over 0.5, in the first place, it is very difficult to form a compound of such a composition. In the case where $\delta$ is less than or equal to 0, as described above, the above-described compounds are not capable of having a conductivity.

Moreover, as the electrolyte layer, a layer composed of a liquid or a solid can be used. Moreover, as an oxygen ion moving through the electrolyte layer, it may be, for example, an ion containing an oxygen atom such as $O^{2-}$, $OH^-$, $CO_3^{2-}$ and the like.

Next, it is preferable that both the solid active materials for constituting the positive electrode and the negative electrode are composed of the mixed oxygen ion and electron conductor.

In this case, the insertion and elimination of oxygen ion or absorption and release of oxygen are performed on the positive electrode and negative electrode. Therefore, it can be made a secondary cell which performs the Rocking chair type charging and discharging by using oxygen or oxygen ion as movable ion. Moreover, the hermetical sealing of a cell is capable of being executed, and the charge and discharge are capable of being carried out by performing only a simple absorption and release or insertion and elimination without any side reaction. Therefore, the realization of a cell system having a long life span can be expected.

Next, it is preferable that the mixed oxygen ion and electron conductor is composed of Ceria-Zirconia complex oxide.

In this case, it can be made a secondary cell capable of smoothly charging and discharging by making the best use of the characteristic of Ceria-Zirconia complex oxide in which the conductive speed of oxygen ion is high.

Next, it is preferable that the Ceria-Zirconia complex oxide is composed of a composition represented by $Ce_{4-x}Zr_xO_{8-y}$, wherein $1.6 \leq x \leq 2.4$, and $0 \leq y \leq 1.2$.

In this case, Ce and Zr in the above-describe Ceria-Zirconia complex oxide can be regularly ordered by reducing Ceria-Zirconia complex oxide represented by the above-described composition at a higher temperature. In this way, the characteristic of the secondary cell can be enhanced by employing the Ceria-Zirconia complex oxide having a regular order of Ce and Zr.

In a Ceria-Zirconia complex oxide of a composition represented by $Ce_{4-x}Zr_xO_{8-y}$ (here, $1.6 \leq x \leq 2.4$, $0 \leq y \leq 1.2$), in the case where the range of x is less than 1.6 or exceeds over 2.4, the above-described regular order of Ce and Zr is not formed, and there is a fear that the characteristic as a secondary cell is not enhanced.

Moreover, in the case where the range of the above-described y exceeds over 1.2, there is a fear that the crystal structure of the Ceria-Zirconia complex oxide cannot retain a stable cubic system.

Next, it is preferable that the Ceria-Zirconia complex oxide indicates respectively one peak, that is, total three peaks with respect to $2\theta=13.8°–14.6°$, $36.0°–37.4°$, and $43.2°–44.9°$ in the powder X-ray diffraction (XRD) measurement using Cu—Kα radiation.

In this case, the insertion and elimination of oxygen ion of the Ceria-Zirconia complex oxide are made easier, and the amount can be increased. Therefore, the characteristics of the cell can be further enhanced.

Next, it is preferable that the electrolyte layer is composed of a solid oxygen ion conductor.

In this case, the secondary cell is an all-solid-state secondary cell which performs the charging and discharging by moving oxygen ion or oxygen through the solids of the positive electrode, the negative electrode and the electrolyte layer, and it does not need a liquid component. Therefore, there is no risk of liquid leakage and the like. Moreover, in this case, since all of the positive electrode, the negative electrode and the electrolyte layer can be composed of oxides, the preparation of a secondary cell is capable of being carried out by sintering it. Therefore, a secondary cell which is firm and excellent in environmental resistance can be prepared by a simple process.

Moreover, as the oxygen ion conductor, for example, Zirconia-Yttria solid solution, $ZrO_2$—CaO solid solution, $Bi_2O_3$—$Nb_2O_5$ solid solution, $La_{0.8}Sr_{0.2}Ga_{0.8}Mg_{0.2}O_{3-\delta}$ and the like are listed.

It should be noted that in the above-described chemical formula $La_{0.8}Sr_{0.2}Ga_{0.8}Mg_{0.2}O_{3-\delta}$, $\delta$ represents a minute numerical value of $\delta>0$. In the compound of $La_{0.8}Sr_{0.2}Ga_{0.8}Mg_{0.2}O_{3-\delta}$, the conductivity can be carried on by lacking oxygen atoms only by the portion of minute amount $\delta$. Here, $\delta$ can take, for example, a value in the range of $0<\delta \leq 0.5$. In the case where the value of $\delta$ exceeds over 0.5, in the first place, it is very difficult to form a compound of such a composition. In the case where $\delta$ is less than or equal to 0, as described above, the above-described compound is not capable of having a conductivity.

Next, it is preferable that all of the solid active material for constituting the positive electrode, the solid active material for constituting the negative electrode, and the electrolyte layer are composed of oxides, and the interface between the positive electrode and the electrolyte layer and the interface between the negative electrode and the electrolyte layer are composed of a gradient composition which gradually changes from one composition to the other composition.

In this case, the above-described interface which is to be an interference at the time when oxygen ion is inserted and eliminated is substantially nullified. Therefore, the characteristics of the secondary cell can be further enhanced.

As a method of constituting the interface with the above-described gradient composition, for example, there is a method of heating the lamination composed of the positive electrode, the electrolyte layer, and the negative electrode at a high temperature equal to or more than 1000° C., and the like.

Next, it is preferable that the solid active material for constituting the positive electrode and the negative electrode are composed of Ceria-Zirconia complex oxide, and the electrolyte layer is composed of Zirconia solid solution in which a metal element capable of being bivalent or trivalent metal ion has been substituted and solved.

In this case, it becomes further easier that the above-described interface is made the above-described gradient composition. It is because both of the Ceria-Zirconia complex oxide and the Zirconia solid solution have the same crystal structure that is a $CaF_2$ structure.

As a metal element which is capable of being bivalent or trivalent metal ion, for example, Yttrium (Y), Calcium (Ca), Magnesium (Mg), Ytterbium (Yb), Gadolinium (Gd), Scandium (Sc), Samarium (Sm) and the like are listed.

Next, it is preferable that any of the solid active material for constituting the positive electrode, the solid active material for constituting the negative electrode, and the electrolyte layer has a crystal structure belonging to the same Bravais lattice.

In this case, it is further easier that the above-described interface is made the above-described gradient composition.

It should be noted that the crystal structures belonging to the above-described Bravais lattices include 14 kinds of simple cubic lattice, body-centered cubic lattice, face-centered cubic lattice, simple tetragonal lattice, body-centered tetragonal lattice, simple orthorhombic lattice, body-centered orthorhombic lattice, base-centered orthorhombic lattice, face-centered orthorhombic lattice, simple trigonal lattice, simple hexagonal lattice, simple monoclinic lattice, body-centered monoclinic lattice, and simple triclinic lattice.

The preferred embodiments will now be described with reference to the accompanying drawings, wherein like reference numerals designate corresponding or identical elements throughout the carious drawings.

EXAMPLES

Example 1

Next, Examples of the present invention will be described below with reference to FIGS. 1–4.

A secondary cell of the present Example comprises a positive electrode 13 and a negative electrode 17 which comprising a solid active material and an electrolyte layer 15 which has been intervened between the positive electrode 13 and the negative electrode 17, as shown in FIG. 1. Then, both of solid active materials for constituting the above-described positive electrode 13 and the negative electrode 17 are composed of a mixed oxygen ion and electron conductor capable of inserting and eliminating oxygen ion or absorbing and releasing oxygen.

The secondary cell 1 of the present Example is, as shown in FIG. 1, an all-solid-state secondary cell in which the positive electrode 13, the negative electrode 17, and the electrolyte layer 15 are composed of solid oxides, respectively. Moreover, the secondary cell 1 comprises the positive electrode 13, the negative electrode 17, and the electrolyte layer 15, which have been respectively molded in a disc shape and laminated, and has a three-layer laminated structure.

In addition, an interface 191 between the positive electrode 13 and the electrolyte layer 15 and an interface 192 between the negative electrode 17 and the electrolyte layer 15 are composed of a gradient composition in which the composition gradually changes from one composition to the other composition.

In the present Example, the positive electrode 13 and the negative electrode 17 are composed of a mixed oxygen ion and electron conductor capable of inserting and eliminating oxygen ion or absorbing and releasing oxygen.

Therefore, the secondary cell 1 can carry out the charging and discharge of the cell by absorbing and releasing oxygen or inserting and eliminating oxygen ion within the cell system. Namely, at the time when the cell is charged or discharged, on the surface of the positive electrode 13 and the negative electrode 17 which are composed of the mixed oxygen ion and electron conductor, an electron and oxygen ion are inserted or eliminated or oxygen is absorbed or released accompanying its electrochemical oxidation-reduction reaction. Then, an electron and oxygen ion which have been inserted and eliminated or oxygen which has been absorbed or released diffuse within the positive electrode 13, the negative electrode 17, or the electrolyte layer 15.

In this way, in the secondary cell 1 of the present Example, the insertion and elimination of oxygen ion or absorption and release of oxygen are utilized for the charging and discharging reactions of the cell.

Next, a method of manufacturing a secondary cell of the present Example will be described below.

In the present Example, according to the following procedure, first, a material for the positive electrode and a material for the negative electrode have been prepared.

First, Cerium nitrate (III) and Zirconium nitrate were mixed so that Ce/Zr is 5/5 in mole ratio, and the mixture aqueous solution was adjusted. Aqueous ammonia was dropped while the agitation was performed, and the mixture aqueous solution was neutralized and the precipitation was generated.

Subsequently, aqueous hydrogen peroxide containing hydrogen peroxide of the half amount of the number of moles of cerium ions contained in the mixture aqueous solution after neutralization was added and agitated, thereby a slurry was obtained. The obtained slurry was sprayed into the reaction tube set under the atmosphere of input gas temperature 400° C. and output gas temperature 250° C., the drying was carried out by a spray drying method, ammonium nitrate coexisted in the slurry was evaporated and decomposed, the powder of the Ceria-Zirconia complex oxide was adjusted (evaporative decomposition).

Furthermore, the powder of the Ceria-Zirconia complex oxide and platinum black were adequately mixed in a mortar so that the weight ratio becomes 3:1, and this was made material of the positive and negative electrodes.

Next, a material of electrolyte was adjusted as the followings.

First, a mixture aqueous solution in which Zirconium nitrate and Yttrium nitrate were mixed so that the mole ratio is 92:8 was adjusted. The mixture aqueous solution was neutralized and precipitated by a method similar to the case of the above-described material for the positive electrode and negative electrode, and further, the evaporative decomposition was carried out, and the powder of Zirconia-Yttria complex oxide was obtained as material for the electrolyte.

Next, an all-solid-state secondary cell was prepared by utilizing the above-described material for the positive electrode and negative electrode, and the material for the electrolyte.

First, the powder 0.03 g of Zirconia-Yttria complex oxide which is the above-described material for electrolyte was pressed under the pressure of two tons using a metal mold of diameter of φ15 mm into a thin metal sheet. Subsequently, on one side of the surfaces of the Zirconia-Yttria complex oxide which has been pressed in a thin metal sheet, 0.2 g of the above-described material for the positive electrode and the negative electrode was coated, and was pressed under the pressure of 5 tons using the metal mold which is the same with the above-described metal mold. Furthermore, similarly, also on the surface of the reverse side, the material for the positive electrode and negative electrode was coated, pressed and a lamination having a three-layer structure in a disc shape was prepared.

This lamination was put into a graphite furnace, and heated at the temperature of 1400° C. in the resting Ar gas. The Ceria-Zirconia complex oxide of the above-described lamination is strongly reduced and becomes $Ce_2Zr_2O_7$ composition of pyrochlore type by this heating treatment. Moreover, the oxide is sintered by this heating treatment at 1400° C., and a gradient composition in which interface between the electrodes and electrolyte gradually changes from one composition to the other composition is formed.

Figure 2:
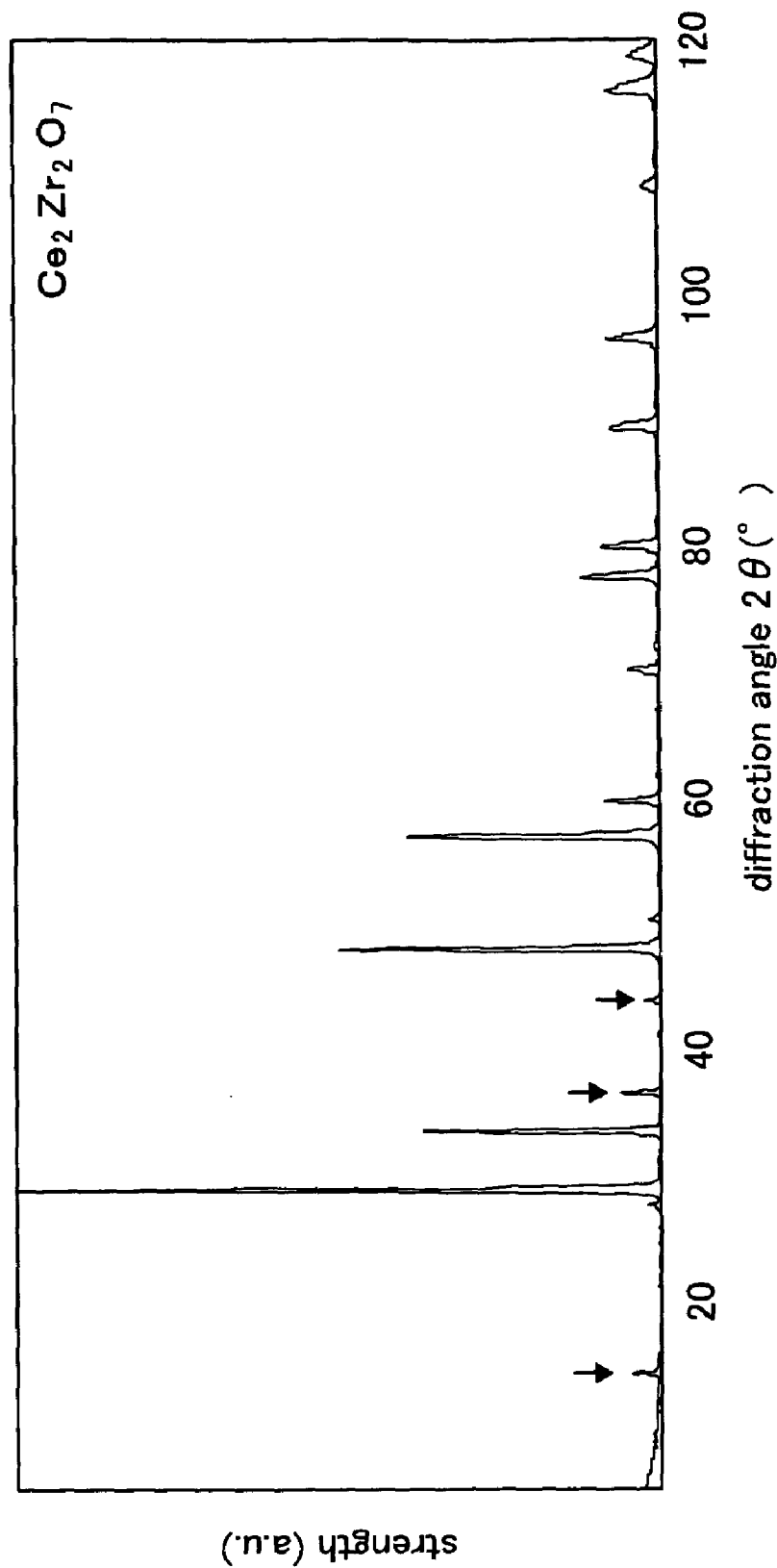
FIG. 2 is an illustration showing X-ray diffraction (XRD) pattern of Ceria-Zirconia complex oxide $Ce_2Zr_2O_7$ according to Example 1 of the present invention.

It should be noted that the X-ray diffraction (XRD) pattern of the Ceria-Zirconia complex oxide of $Ce_2Zr_2O_7$ composition is shown in FIG. 2.

Subsequently, the above-described lamination was further heated at the temperature of 200° C. under the oxygen atmosphere, and was made a secondary cell (Sample E) of the present Example.

Figure 3:
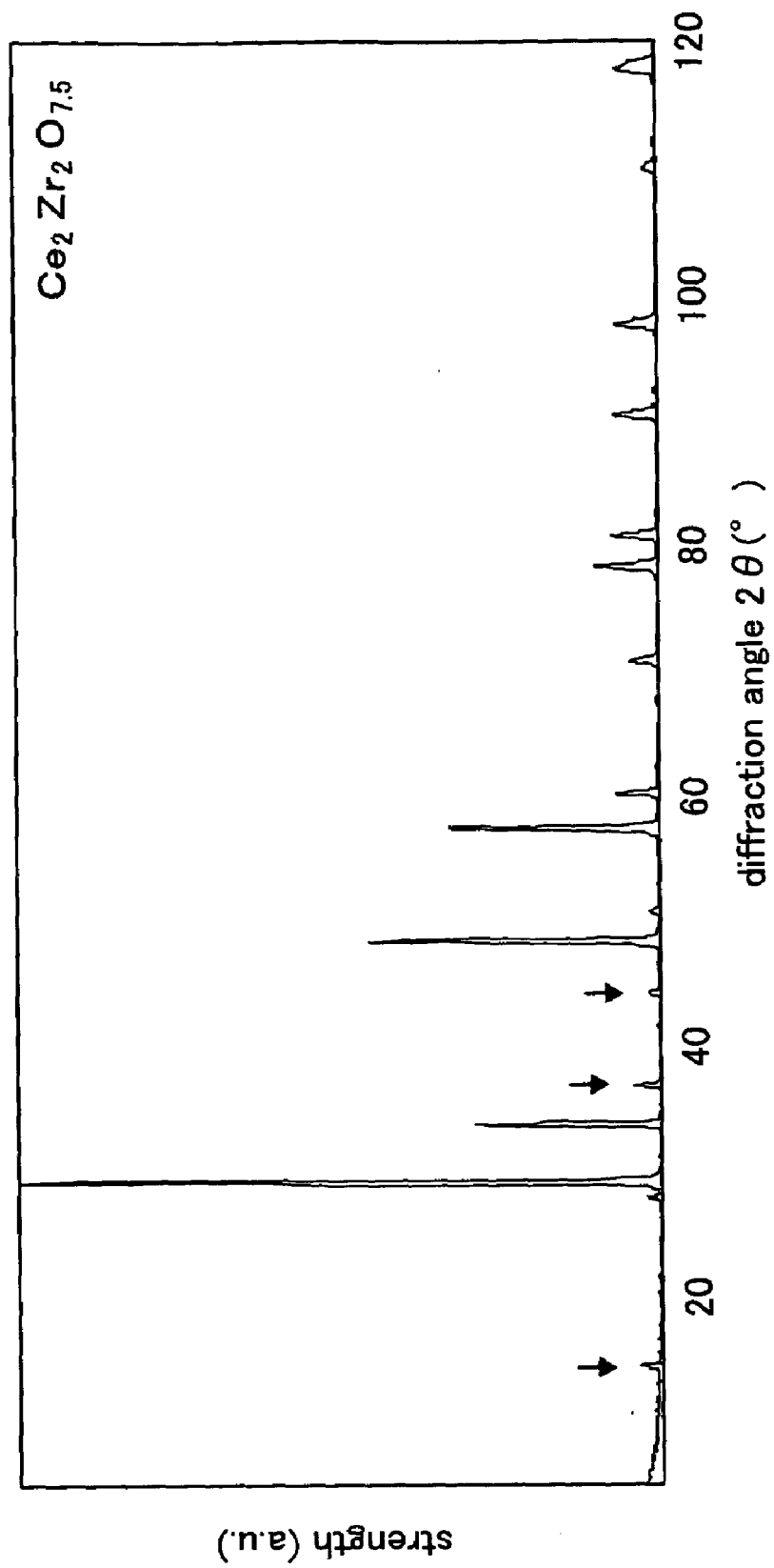
FIG. 3 is an illustration showing X-ray diffraction (XRD) pattern of Ceria-Zirconia complex oxide $Ce_2Zr_2O_{7.5}$ according to Example 1 of the present invention.

It should be noted that the above-described Ceria-Zirconia complex oxide becomes $Ce_2Zr_2O_{7.5}$ composition by heating at the temperature of 200° C. The X-ray diffraction (XRD) pattern of the Ceria-Zirconia complex oxide of this $Ce_2Zr_2O_{7.5}$ composition is shown in FIG. 3.

In the present Example, the composition of the Ceria-Zirconia complex oxide has been changed by heating the lamination as described above.

First, the Ceria-Zirconia complex oxide is reduced by heating at a temperature equal to or more than 1000° C., and a Ceria-Zirconia complex oxide of pyrochlore type ($Ce_2Zr_2O_7$) is produced. Then, by further heating at the temperature of 200° C. under the oxygen atmosphere, a Ceria-Zirconia complex of $Ce_2Zr_2O_{7.5}$ composition has been made. Moreover, although it has not been carried out in the present Example, when the Ceria-Zirconia complex oxide is heated at the temperature of 800° C. under the oxygen atmosphere after it has been heated at a high temperature of equal to or more than 1000° C., the Ceria-Zirconia complex oxide of $Ce_2Zr_2O_8$ composition is obtained. The X-ray diffraction (XRD) pattern of this $Ce_2Zr_2O_8$ is shown in FIG. 4.

Such a Ceria-Zirconia complex oxide can insert oxygen ion or absorb oxygen or discharge them in the range of $0 \leq x \leq 1$ in the chemical formula $Ce_2Zr_2O_{7+x}$. Particularly in the present Example, the above-described Ceria-Zirconia complex oxide has been finally made a composition of $Ce_2Zr_2O_{7.5}$. This $Ce_2Zr_2O_{7.5}$ composition can be employed for both a positive electrode and a negative electrode.

Figure 4:
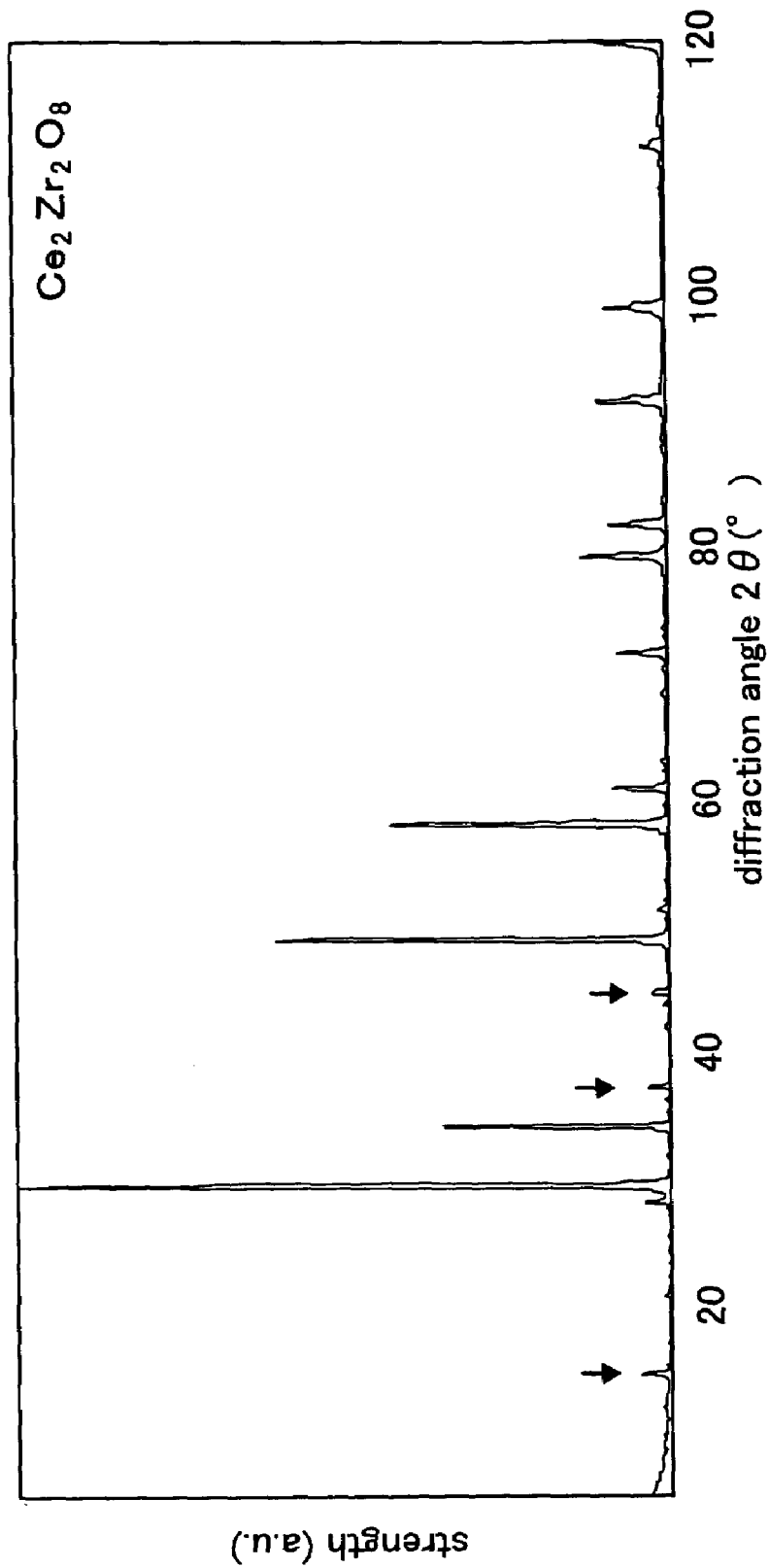
FIG. 4 is an illustration showing X-ray diffraction (XRD) pattern of Ceria-Zirconia complex oxide $Ce_2Zr_2O_8$ according to Example 1 of the present invention.

Moreover, as known from FIG. 2–FIG. 4, the Ceria-Zirconia complex oxides represented by $Ce_2Zr_2O_7$, $Ce_2Zr_2O_{7.5}$, and $Ce_2Zr_2O_8$ have a common peak shown by the arrow in FIGS. 2–4. In this way, by employing the Ceria-Zirconia complex oxides having a characteristic peak in the X-ray diffraction (XRD) pattern, the characteristic of a secondary cell can be enhanced.

It should be noted that the measurement of the above-described X-ray diffraction (XRD) pattern was performed using a X-ray diffraction device (RINT 2200; made by Rigaku Corp.).

Comparative Example

Next, in order to elucidate excellent points of the secondary cell (Sample E) of the present Example, the all-solid-state secondary cell (Sample C) in which lithium ion is made movable ion was prepared.

First, Lithium carbonate ($Li_2CO_3$) and electrolyte Manganese dioxide ($MnO_2$) was mixed for four hours using a ball mill so that the mole ratio of Li : Mn becomes 1:2. The obtained mixture was heated up to the temperature of 930° C. at the rate of 5° C./min under the oxygen atmosphere, and maintained at this temperature for 12 hours. Subsequently, it is slowly cooled down to room temperature at the rate of 1° C./min, and $LiMn_2O_4$ was prepared. This $LiMn_2O_4$ can be changed in the range where Li composition varies from 0 to 2, and can be employed for both a positive electrode and a negative electrode.

Next, a material for an electrolyte was prepared according to the following procedure:

First, $Li_4SiO_4$, $Li_2S$, and $SiS_2$ were mixed at the mole ratio of 5:57:38. Next, by performing the mechanomilling treatment to this mixture for 10 hours, an amorphous lithium ion solid electrolyte (material for electrolyte) represented by the composition ratio of 0.05 $Li_4SiO_4$-0.57 $Li_2S$-0.38 $SiS_2$ was synthesized.

Next, the above-described $LiMn_2O_4$, 0.05 $Li_4SiO_4$-0.57 $Li_2S$-0.38 $SiS_2$ for a material for an electrolyte, and carbon for an electrically conductive material were mixed at the ratio of 50:45:5, and made a material for a positive electrode and a negative electrode. A lamination of three-layer structure in a disc was prepared using this material for a positive electrode and a negative electrode, and the above-described material for an electrolyte, similarly to the case of the above-described Sample E. Furthermore, this lamination was heated at the temperature of 1400° C. similarly to the case of Sample E, and subsequently, heated at the temperature of 200° C., and made a secondary cell (Sample C) for performing the comparison.

Experimental Example

Next, the characteristics of the cells of the above-described Sample E and Sample C were compared as the followings.

First, both electrodes of the Sample E and the Sample C are sandwiched with a SUS electrode, the voltage was applied and swept. The changes of current and voltage at this time were measured by a bipolar system cyclic voltammetry. The measurements were performed in the temperature controlled bath of 40° C. at the sweeping rate of 2 mV/sec in the range from −10V to 10V of voltage for three cycles.

Figure 5:
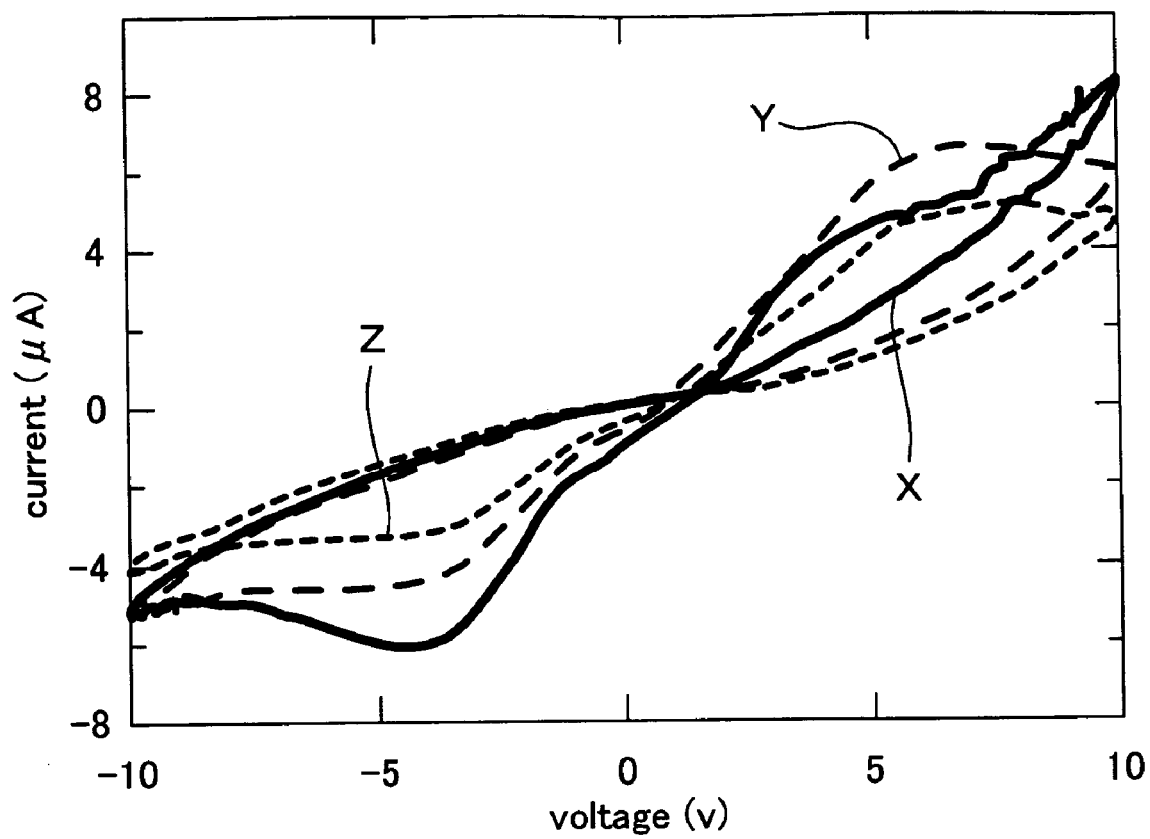
FIG. 5 is an illustration showing the measurement results of cyclic voltammetry of a secondary cell (Sample E) according to Example of the present invention.
Figure 6:
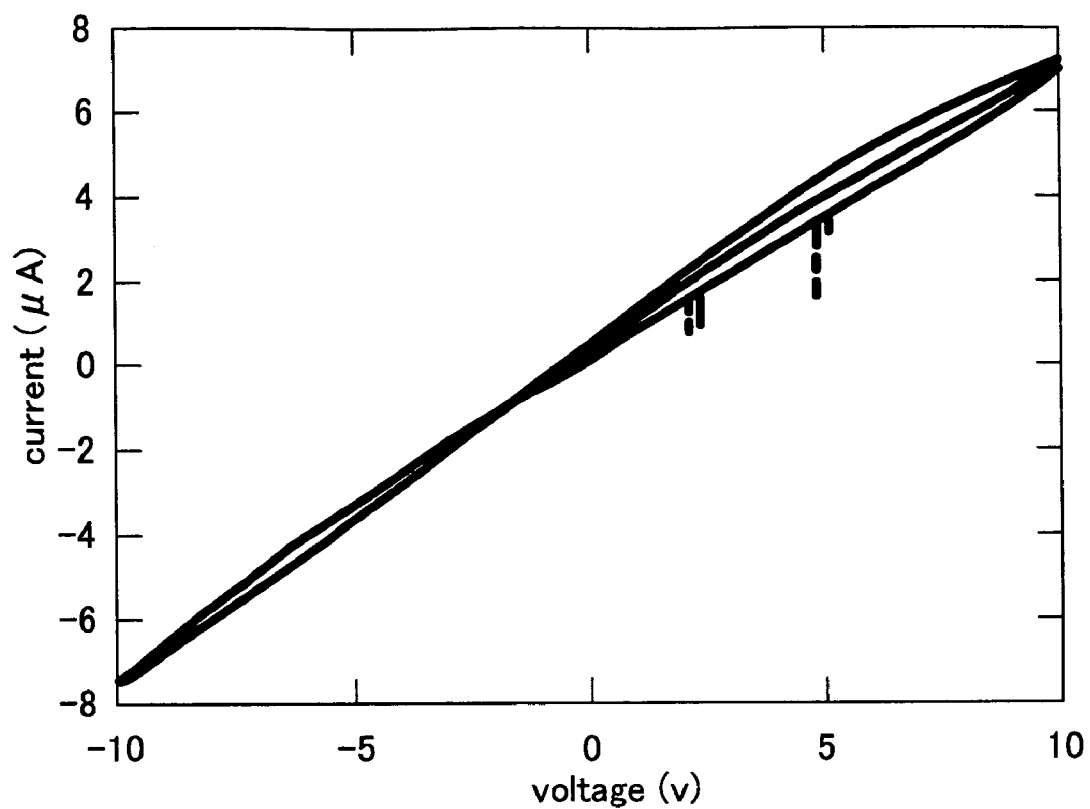
FIG. 6 is an illustration showing the measurement results of cyclic voltammetry of a secondary cell (Sample C) according to Example of the present invention.

The results are shown in FIG. 5 (Sample E) and in FIG. 6 (Sample C) as a cyclic voltammogram. It should be noted that abscissa axis represents a voltage (V), and the ordinate axis represents a current (μA). Moreover, in FIG. 5, the result of first cycle is indicated by the solid line X, the second cycle is indicated by the dotted line Y, and the third cycle is indicated by the dotted line Z.

As known from FIG. 5, in Sample E, a reversible reaction has been observed, it has been indicated that Sample E has the characteristic of a secondary cell. Moreover, it has been clarified that Sample E has a comparatively high capacity.

On the other hand, as being known from FIG. 6, in Sample C, the charging and discharging could be hardly carried out.

Obviously, numerous modifications and variations of the present invention are possible in light of the above teachings. It is therefore to be understood that, within the scope of the appended claims, the invention may be practiced otherwise than as specifically described here.

What is claimed is:

1. A secondary cell comprising:
   a positive electrode and a negative electrode both comprising a solid active material; and
   an electrolyte layer which has been intervened between the positive electrode and the negative electrode,
   wherein both of the solid active materials for constituting the positive electrode and the negative electrode are composed of a mixed oxygen ion and electron conductor capable of inserting and eliminating oxygen ion or absorbing and releasing oxygen.

2. The secondary cell as claimed in claim 1, wherein the mixed oxygen ion and electron conductor is composed of Ceria-Zirconia complex oxide.

3. The secondary cell as claimed in claim 2, wherein the Ceria-Zirconia complex oxide is composed of a composition represented by $Ce_{4-x}Zr_xO_{8-y}$, wherein $1.6 \leq x \leq 2.4$, and $0 \leq y \leq 1.2$.

4. The secondary cell as claimed in claim 3, wherein the Ceria-Zirconia complex oxide indicates respectively one peak, that is, total three peaks with respect to $2\theta = 13.8°–14.6°$, $36.0°–37.4°$, and $43.2°–44.9°$ in a powder X-ray diffraction (XRD) measurement using Cu—Kα radiation.

5. The secondary cell as claimed in claim 1, wherein the electrolyte layer is composed of a solid oxygen ion conductor.

6. The secondary cell as claimed in claim 5, wherein all of the solid active material for constituting the positive electrode, the solid active material for constituting the negative electrode, and the electrolyte layer are composed of oxides, and an interface between the positive electrode and the electrolyte layer and an interface between the negative electrode and the electrolyte layer are composed of a gradient composition.

7. The secondary cell as claimed in claim 5, wherein the solid active material for constituting the positive electrode and the negative electrode are composed of Ceria-Zirconia complex oxide, and the electrolyte layer is composed of a Zirconia solid solution which comprises a metal element capable of being bivalent or trivalent metal ion.

8. The secondary cell as claimed in claim 5, wherein any of the solid active material for constituting the positive electrode, the solid active material for constituting the negative electrode, and the electrolyte layer has a crystal structure belonging to the same Bravais lattice.

9. The secondary cell as claimed in claim 3, wherein the Ceria-Zirconia complex oxide is composed of a composition represented by $Ce_2Zr_2O_{7.5}$.

10. The secondary cell as claimed in claim 7, wherein the metal element is selected from the group consisting of yttrium, calcium, magnesium, ytterbium, gadolinium, scandium, and samarium.

11. The secondary cell as claimed in claim 8, wherein crystal structures of the Bravais lattice are from the group consisting of simple cubic lattice, body-centered cubic lattice, face-centered cubic lattice, simple tetragonal lattice, body-centered tetragonal lattice, simple orthorhombic lattice, body-centered orthorhombic lattice, base-centered orthorhombic lattice, face-centered orthorhombic lattice, simple trigonal lattice, simple hexagonal lattice, simple monoclinic lattice, body-centered monoclinic lattice, and simple triclinic lattice.

* * * * *